United States Patent [19]
Miller

[11] Patent Number: 5,997,252
[45] Date of Patent: Dec. 7, 1999

[54] WIND DRIVEN ELECTRICAL POWER GENERATING APPARATUS

[76] Inventor: Duane G. Miller, 7942 Christiana Way, Indianapolis, Ind. 46256

[21] Appl. No.: 08/998,259

[22] Filed: Dec. 24, 1997

[51] Int. Cl.⁶ ................................................. B63H 9/04
[52] U.S. Cl. ................................ 416/197 A; 416/132 B; 416/197 A; 416/197 R; 416/210 R; 416/236 R; 416/DIG. 4
[58] Field of Search ............................ 416/132 B, 107 R, 416/197 R, 210 R, 236 R, DIG. 4; 290/55

[56] References Cited

U.S. PATENT DOCUMENTS

| | | | |
|---|---|---|---|
| 387,102 | 7/1888 | Nagel | 416/132 B |
| 2,224,851 | 12/1940 | Lea | 416/197 A |
| 2,957,621 | 10/1960 | Haims . | |
| 2,974,728 | 3/1961 | Culp . | |
| 3,799,699 | 3/1974 | Master et al. . | |
| 3,988,072 | 10/1976 | Sellman . | |
| 4,019,828 | 4/1977 | Bunzer | 415/122 R |
| 4,329,593 | 5/1982 | Willmouth | 290/44 |
| 4,402,650 | 9/1983 | Jones | 416/87 |
| 4,508,972 | 4/1985 | Willmouth | 290/55 |
| 4,846,629 | 7/1989 | Takigawa . | |
| 5,163,813 | 11/1992 | Schlenker . | |
| 5,336,933 | 8/1994 | Ernster . | |

Primary Examiner—Thomas E. Denion
Assistant Examiner—Ninh Nguyen
Attorney, Agent, or Firm—Maginot, Addison & Moore

[57] ABSTRACT

A wind driven electrical power generating apparatus includes an armature. The apparatus also includes a wing secured to the armature. The wing defines a pocket having a hub end and an outer end. The width of the pocket monotonically increases from the hub end to the outer end. Moreover, the depth of the pocket monotonically increases from the hub end to the outer end. The wing and the armature produce a relatively large amount of torque during rotation of the armature which is converted to high rotational speed by a gear mechanism thereby driving a generator at a relatively high rotational speed. Such high torque production eliminates the need to rotate the armature at a high rotational speed. Moreover, the configuration of the wing allows the armature to be rotated in the presence of relatively low wind velocities. Hence, the apparatus may be efficiently utilized for electrical power generation in geographic areas which typically experience relatively low wind velocities.

21 Claims, 2 Drawing Sheets

WIND DRIVEN ELECTRICAL POWER GENERATING APPARATUS

TECHNICAL FIELD OF THE INVENTION

The present invention relates generally to a power generating apparatus, and more particularly to a wind driven electrical power generating apparatus having a wing assembly which produces a relatively large amount of torque and which also may be operated in the presence of relatively low wind velocities.

BACKGROUND OF THE INVENTION

A wind driven electrical power generating apparatus, such as a windmill, is commonly utilized to convert the energy present in wind into electrical energy. In particular, windmills typically include a number of blades or wings coupled to an output shaft. The wings are rotated or otherwise moved by the force of the wind acting thereon. The output shaft is typically coupled to an input shaft of an electric generator or other type of energy converter such that when the input shaft is rotated by the wind acting upon the wings, the generator produces electrical energy.

However, such electrical power generators typically require the input shaft thereof to be rotated at a relatively high speed in order to produce desirable quantities of electrical energy. For example, the input shaft of the generator may have to be rotated at 100 revolutions-per-minute in order to generate a single kilowatt (kW). Hence, windmills which have heretofore been designed typically require the output shaft to be rotated at a relatively high speed in order to correspondingly rotate the input shaft of the generator at a relatively high speed.

Such a speed requirement typically precludes efficient use of windmills in areas in which relatively low wind velocities are present. In particular, high wind velocities are generally required to drive the wings and hence the input shaft of the generator at the high speeds which are required to efficiently drive the generator.

What is needed therefore is a wind driven electrical power generating apparatus which overcomes one or more of the above-mentioned drawbacks. What is further needed is a wind driven electrical power generating apparatus which generates electrical power in the presence of relatively low wind velocities.

DISCLOSURE OF THE INVENTION

In accordance with a first embodiment of the present invention, there is provided a wind driven electrical power generating apparatus. The apparatus includes an armature. The apparatus also includes a wing secured to the armature. The wing defines a pocket having a hub end and an outer end. The hub end of the pocket has a first width, whereas the outer end of the pocket has a second width. The second width is greater than the first width. The hub end of the pocket has a first depth, whereas the outer end of the pocket has a second depth. The second depth is greater than the first depth.

In accordance with a second embodiment of the present invention, there is provided a wind driven electrical power generating apparatus. The apparatus includes an armature. The apparatus also includes a wing secured to the armature. The wing defines a pocket having a hub end and an outer end. The width of the pocket monotonically increases from the hub end to the outer end. Moreover, the depth of the pocket monotonically increases from the hub end to the outer end.

It is therefore an object of present invention to provide a new and useful wind driven electrical power generating apparatus.

It is also an object of the present invention to provide an improved wind driven electrical power generating apparatus.

It is moreover an object of the present invention to provide a wind driven electrical power generating apparatus which generates electrical power in the presence of relatively low wind velocities.

It is yet further an object of the present invention to provide a wind driven electrical power generating apparatus which produces a relatively large amount of torque.

BEST MODE FOR CARRYING OUT THE INVENTION

Figure 1:
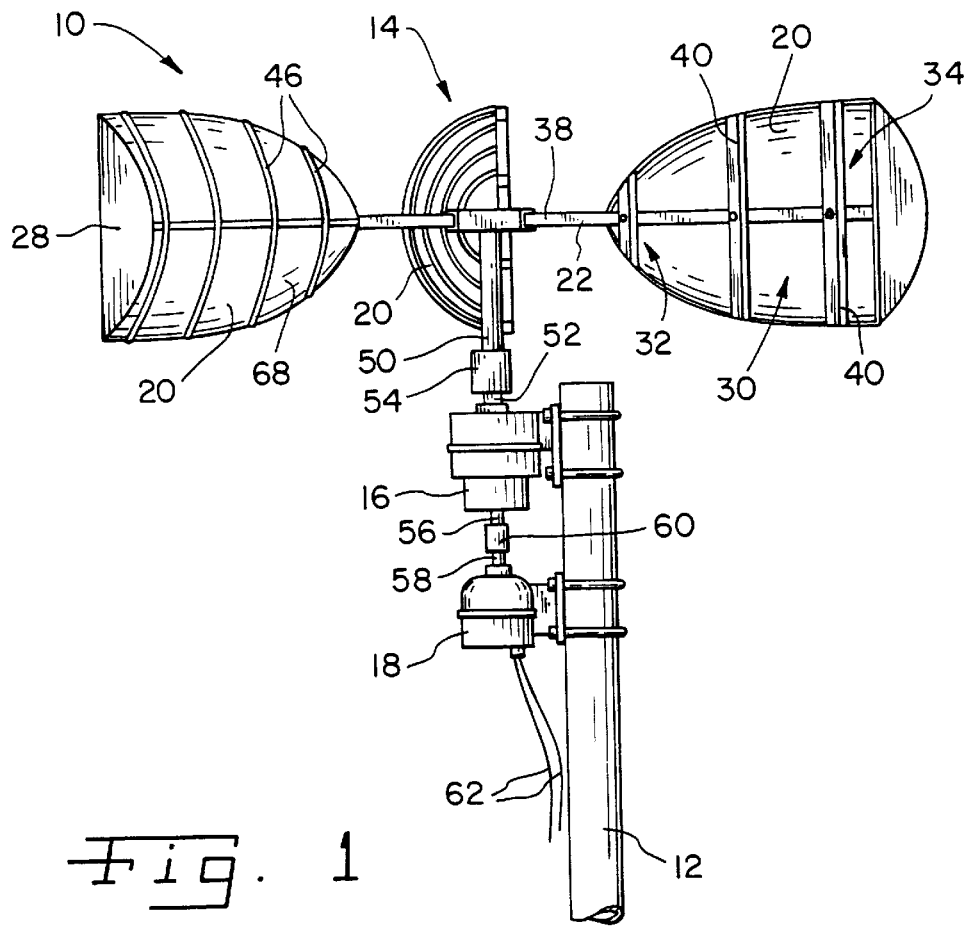
FIG. 1 is a perspective view of a wind driven electrical power generating apparatus which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
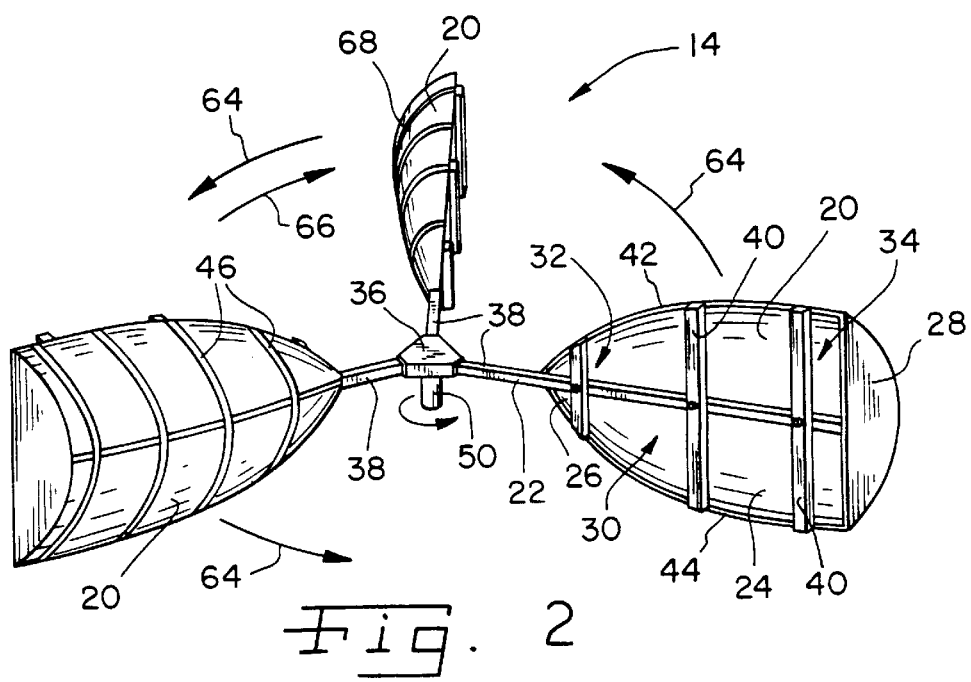
FIG. 2 is a perspective view of the wing assembly of the wind driven electrical power generating apparatus of FIG. 1.

Referring now to FIGS. 1–2, there is shown a windmill 10 secured to a support structure such as a pole 12. The windmill 10 includes a wing assembly 14, a gear mechanism 16, and an electrical generator 18. Electrical energy generated by the generator 18 may be used for powering a number of devices associated with a commercial building or a residential dwelling.

Figure 3:
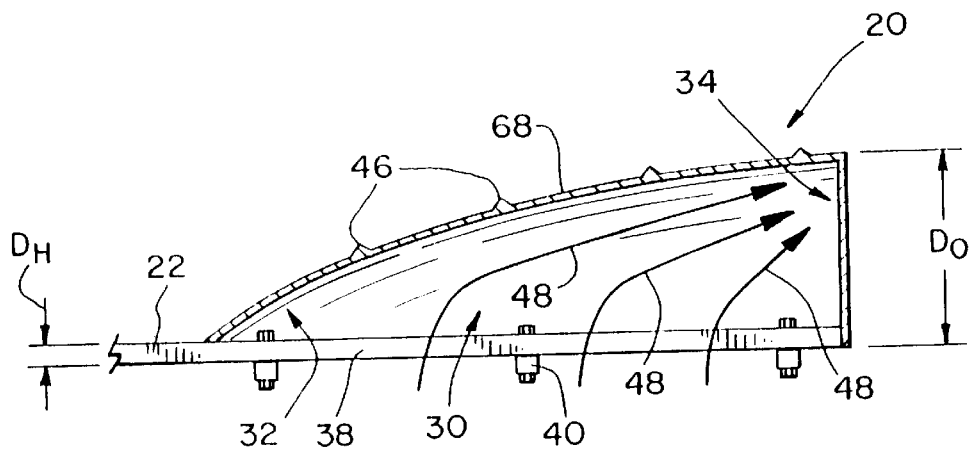
FIG. 3 is a top elevational view, partially in cross-section, of one of the wings of the wing assembly of FIG. 2.
Figure 4:
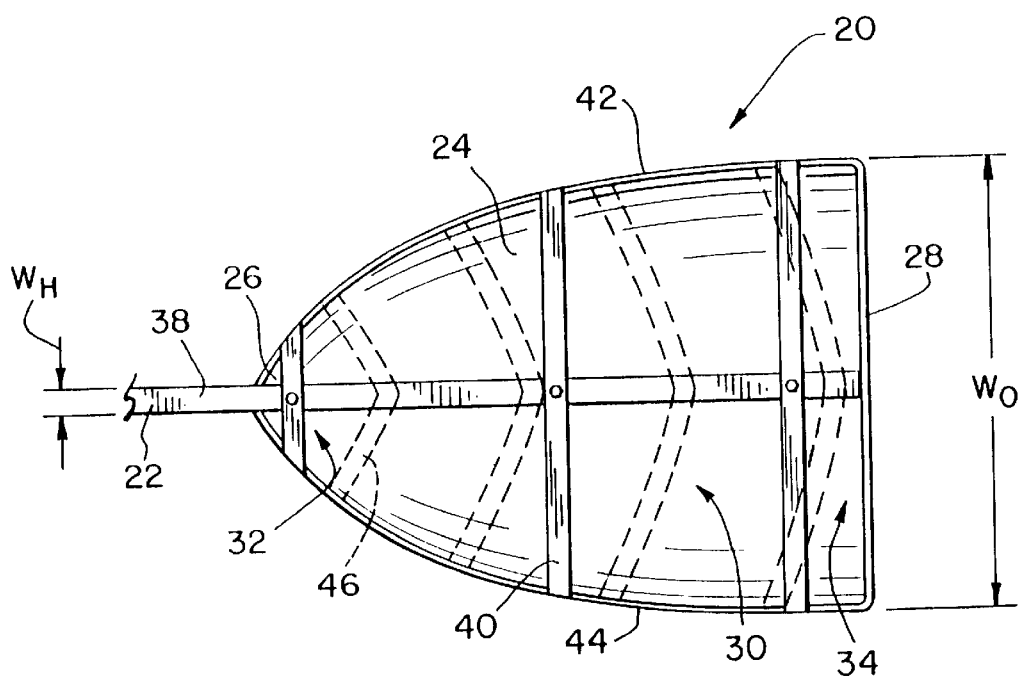
FIG. 4 is a side elevational view of the wing of FIG. 3.

As shown in FIG. 2, the wing assembly 14 includes a number of wings 20 each of which is secured to an armature 22. Each of the wings 20 has an intermediate wall 24, a hub wall 26, and an outer wall 28. As shown in FIGS. 2–4, the intermediate wall 24, the hub wall 26, and the outer wall 28 are configured to define a pocket 30 which has a hub end 32 and an outer end 34. The armature 22 includes a central hub 36 having a number of central support members 38 extending outwardly therefrom. The central support members 38 are secured to the hub wall 26 and the outer wall 28 of the wings 20. Hence, the central support members 38 are positioned such that the support members 38 extend over the pocket 30 from the hub end 32 of the pocket 30 to the outer end 34 of the pocket 30.

In addition, the armature 22 includes a number of lateral support members 40. The lateral support members 40 are secured to the central support members 38. As shown in FIG. 4, the lateral support members 40 are positioned substantially perpendicular to the central support members and extend from an upper lateral edge 42 of the pocket 30 to a lower lateral edge 44 of the pocket 30. Moreover, the wings 20 further have a number of ribs 46 defined therein. The ribs 46 enhance the structural rigidity and stiffness of the wings 20.

The pocket 30 is configured to facilitate rotation of the armature 22. In particular, the width of the pocket 30 monotonically increases from the hub end 32 thereof to the outer end 34 thereof. Moreover, the depth of the pocket 30 increases monotonically from the hub end 32 thereof to the outer end 34 thereof. What is meant herein by the term "monotonically increases" is that the respective magnitudes of the width and depth of the pocket 30 continuously increases (i.e. at no point decreases) from the hub end 32 to the outer end 34 of the pocket 30. Hence, the width $W_O$ of the outer end 34 of the pocket 30 is greater than the width $W_H$ of the hub end 26 of the pocket 30, whereas the depth $D_O$ of the outer end 34 of the pocket 30 is greater than the depth DH Of the hub end 26 of the pocket 30. Preferably, the magnitudes of the widths are $W_O$=42 inches and $W_H$=2.5 inches, whereas the magnitudes of the depths are $D_O$=18 inches and $D_H$=6 inches.

Such a configuration of the wings 20 facilitates operation of the windmill 10 in the presence of relatively low wind velocities. In particular, the increasing width and depth of the pocket 30 creates a "sail-like" structure which is particularly useful for commencing rotation of the armature 22 from a rest position in the presence of relatively low wind velocities. In addition, the configuration of the pocket 30 directs wind into the wing 20 in the general direction of arrows 48 of FIG. 3 thereby causing the force exerted on the wing 20 by the wind to be exerted on the outer end 34 of the pocket 30. It should be appreciated that such direction of the wind into the wing 20 increases the magnitude of the torque produced by the wing assembly 14 during rotation of the armature 22. In particular, the central support members 38 function as the torque arms of the armature 22. The torque produced by the wing assembly 14 during rotation armature 22 is therefore the product of the magnitude of the force generated by the wind and the length of the torque arm (i.e. the point on each of the central support members 38 at which the force of the wind is exerted). Hence, by directing the wind into the pocket 30 in the general direction of arrows 48 of FIG. 3, the force generated by the wind is exerted on the outer end 34 of the pocket 30 thereby increasing the length of the torque arm which in turn increases the magnitude of the torque being produced by the wing assembly 14 during rotation of the armature 22.

Moreover, the configuration of the wings 20 creates a predetermined amount drag during rotation of the armature 22 thereby controlling the rotational speed of the wing assembly 14 within a predetermined range, such as 6–18 revolutions-per-minute. In particular, as the wing assembly 14 is rotated in the general direction of arrows 64 of FIG. 2, a force or drag is exerted on a backside 68 of the wings 20 in the general direction of arrow 66 of FIG. 2. Such a force or drag, along with the drag associated with a number of other components included in the windmill 10 (e.g. the gear mechanism 16 and the generator 18) slows the rotational speed of the wing assembly 14 to within a predetermined range such as 6–18 revolutions-per-minute. It should be appreciated that rotation of the wing assembly 14 within such a range produces the rotational torque and speed necessary for operation of the gear mechanism 16 and the generator 18 (as discussed further below), yet reduces the amount of noise that is generated during operation of the windmill 10.

The gear mechanism 16 converts the relatively high rotational torque generated by the wing assembly 14 into relatively high rotational output speed for use by the generator 18. In particular, the armature 22 of the wing assembly 14 further includes an output shaft 50. The output shaft 50 is non-rotatably coupled to an input shaft 52 of the gear mechanism 16 by a coupling member 54. Hence, rotation the output shaft 50 of the armature 22 causes the input shaft 52 of the gear mechanism 16 to be rotated at the same speed. For example, if the armature 22 is rotated at a speed of 10 revolutions-per-minute by the force of the wind acting upon the wings 20, the input shaft 52 of the gear mechanism 16 will likewise be rotated at a speed of 10 revolutions-per-minute.

The gear mechanism 16 further includes an output shaft 56. As shown in FIG. 1, the output shaft 56 is non-rotatably coupled to an input shaft 58 of the generator 18 by a coupling member 60. Hence, rotation the output shaft 56 of the gear mechanism 16 causes the input shaft 58 of the generator 18 to be rotated at the same speed. For example, if the output shaft 56 is rotated at a speed of 100 revolutions-per-minute, the input shaft 58 of the generator 16 will likewise be rotated at a speed of 100 revolutions-per-minute.

The gear mechanism 16 gears up the input rotational speed from the armature 22. In particular, the gear mechanism is preferably configured as a gear increaser which produces an output speed (via the output shaft 56) which is greater in magnitude (i.e. faster) than the input speed of the input shaft 52. For example, the gear mechanism 16 may produce an output speed on the output shaft 56 which is between 27 and 37 times greater in magnitude than the input speed of the input shaft 52. Preferably, the gear mechanism 16 produces an output speed on the output shaft 56 which is 31 times greater in magnitude (i.e. faster) than the input speed of the input shaft 52. One gear mechanism which is suitable for use as the gear mechanism 16 of the present invention is a 1:31 gear increaser which is commercially available as a model number 832A325 gear box from Boston Gear, Incorporated of Quincy, Mass.

As alluded to above, upon rotation of the input shaft 58, the generator 18 generates electrical energy which may be used to power a number of devices associated with a commercial building or a residential dwelling. Such electrical energy may be transmitted to an electrical storage unit such as a battery (not shown) via a pair of power lines 62. The generator 18 is preferably configured as a 4.5 kW, permanent magnet-type, AC 3-phase alternator, although numerous other types of known generators or alternators are contemplated for use in the present invention. One such generator which is suitable for use as the generator 18 of the present invention is the alternator of the Whisper H 4500 Windmill which is commercially available from World Power Technologies of Duluth, Minn.

Industrial Applicability

In operation, wind is directed into the pocket 30 of the wings 20 in the general direction of arrows 48 of FIG. 3. The force generated by the wind urges the wings 20 such that the armature 22 rotates in the general direction of arrows 64 of FIG. 2. During such rotation, a force or drag is exerted on the backside 68 of the wing 20 in the general direction of arrow 66 of FIG. 2 thereby maintaining the rotational speed of the wing assembly within a predetermined range such as 6–18 revolutions-per-minute.

Rotation of the armature 22 likewise causes rotation of the output shaft 50 thereby causing the input shaft 52 of the gear mechanism 16 to be rotated at the same speed. The gear mechanism 16 gears up the input speed of the input shaft 52 so as to produce an output speed on the output shaft 56 and hence the input shaft 58 of the generator 18 which may be 31 times greater in magnitude (i.e. faster) than the input speed of the input shaft 52 of the gear mechanism 16. For example, if the force of the wind drives the wings 20 such that the armature 22 is rotated at a speed of 10 revolutions-per-minute, the output shaft 56 of the gear mechanism 18 and hence the input shaft 58 of the generator 18 will be driven at 310 revolutions-per-minute. Such rotation of the input shaft 58 is then converted into electrical energy by the generator 18 for use by a number of devices associated with a commercial building or a residential dwelling.

From the above discussion it should be appreciated that the windmill 10 has a number of advantages over windmills which have heretofore been designed. For example, the configuration of the pocket 30 allows the wing assembly 14 to generate a relatively large amount of torque relative to windmills which have heretofore been designed. Such large torque production eliminates the need to rotate the armature 22 a relatively high speeds. This is true since the rotational speed necessary to drive the input shaft 58 of the generator 18 may be produced by the gear mechanism 16 instead of the armature 22.

Moreover, the configuration of the pocket 30 allows the wing assembly 14 to commence rotation in relatively low wind velocities. In particular, the pocket 28 creates a "sail-like" structure which is particularly useful for commencing rotation of the armature 22 from a rest position in the presence of relatively low wind velocities.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A wind driven electrical power; generating apparatus, comprising:
    a central hub;
    an armature extending radially outwardly from said central hub; and
    a wing secured to said armature, wherein (i) said wing defines a pocket having a hub end and an outer end, (ii) said hub end of said pocket has a first width, (iii) said outer end of said pocket has a second width, (iv) said second width is greater than said first width, (v) said hub end of said pocket has a first depth, (vi) said outer end of said pocket has a second depth, (vii) said second depth is greater than said first depth, (viii) said hub end of said pocket is positioned a first radial distance from said central hub, (ix) said outer end of said pocket is positioned a second radial distance from said central hub, and (x) said first radial distance is less than said second radial distance.

2. The apparatus of claim 1, wherein:
    the width of said pocket monotonically increases from said hub end to said outer end, and
    the depth of said pocket monotonically increases from said hub end to said outer end.

3. A wind driven electrical power generating apparatus, comprising:
    an armature; and
    a wing secured to said armature, wherein (i) said wing defines a pocket having a hub end and an outer end, (ii) said hub end of said pocket has a first width, (iii) said outer end of said pocket has a second width, (iv) said second width is greater than said first width, (v) said hub end of said pocket has a first depth, (vi) said outer end of said pocket has a second depth, (vii) said second depth is greater than said first depth, (viii) said armature includes a central support member, and (ix) said central support member is secured to said wing such that said central support member is positioned over said pocket and extends from said hub end to said outer end.

4. The apparatus of claim 3, wherein:
    said pocket further has an upper lateral edge and a lower lateral edge,
    said armature further includes a number of lateral support members, and
    each of said lateral support members is secured to said wing such that said lateral support member is positioned over said pocket and extends from said upper lateral edge to said lower lateral edge.

5. The apparatus of claim 1, further comprising a gear mechanism, wherein:
    said armature includes an armature output shaft,
    said gear mechanism includes a gear input shaft,
    said armature output shaft is coupled to said gear input shaft, and
    rotation of said armature causes rotation of said gear input shaft.

6. The apparatus of claim 5, further comprising a generator, wherein:
    said gear mechanism includes a gear output shaft,
    said generator includes a generator input shaft,
    said generator input shaft is coupled to said gear output shaft, and
    rotation of said gear output shaft causes rotation of said generator input shaft.

7. The apparatus of claim 6, wherein:
    rotation of said armature output shaft at a first speed causes (i) said gear input shaft to be rotated at said first speed, and (ii) said gear output shaft to be rotated at a second speed, and
    said first speed is different than said second speed.

8. The apparatus of claim 7, wherein said second speed is greater than said first speed.

9. The apparatus of claim 8, wherein:
    said second speed is X times greater than said first speed, and $$27.0 < X < 37.0.$$

10. The apparatus of claim 1, wherein:
    said wing includes a hub wall, an outer wall, and an intermediate wall, and
    said hub wall, said outer wall, and said intermediate wall are configured so as to define said pocket.

11. A wind driven electrical power generating apparatus, comprising:
    a central hub;
    an armature extending radially outwardly from said central hub; and
    a wing secured to said armature, wherein (i) said wing defines a pocket having a hub end and an outer end, (ii) the width of said pocket monotonically increases from said hub end to said outer end, (iii) the depth of said pocket monotonically increases from said hub end to said outer end, (iv) said hub end of said pocket is positioned a first radial distance from said central hub, (v) said outer end of said pocket is positioned a second radial distance from said central hub, and (vi) said first radial distance is less than said second radial distance.

12. A wind driven electrical power generating apparatus, comprising:

an armature; and a wing secured to said armature, wherein (i) said wing defines a pocket having a hub end and an outer end, (ii) the width of said pocket monotonically increases from said hub end to said outer end, (iii) the depth of said pocket monotonically increases from said hub end to said outer end, (iv) said armature includes a central support member, and (v) said central support member is secured to said wing such that said central support member is positioned over said pocket and extends from said hub end to said outer end.

13. The apparatus of claim 12, wherein:

said pocket further has an upper lateral edge and a lower lateral edge, said armature further includes a number of lateral support members, and each of said lateral support members is secured to said wing such that said lateral support member is positioned over said pocket and extends from said upper lateral edge to said lower lateral edge.

14. The apparatus of claim 11, further comprising a gear mechanism, wherein:

said armature includes an armature output shaft, said gear mechanism includes a gear input shaft, said armature output shaft is coupled to said gear input shaft, and rotation of said armature causes rotation of said gear input shaft.

15. The apparatus of claim 14, further comprising a generator, wherein:

said gear mechanism includes a gear output shaft, said generator includes a generator input shaft, said generator input shaft is coupled to said gear output shaft, and rotation of said gear output shaft causes rotation of said generator input shaft.

16. The apparatus of claim 15, wherein:

rotation of said armature output shaft at a first speed causes (i) said gear input shaft to be rotated at said first speed, and (ii) said gear output shaft to be rotated at a second speed, and said first speed is different than said second speed.

17. The apparatus of claim 16, wherein said second speed is greater than said first speed.

18. The apparatus of claim 17, wherein:

said second speed is X times greater than said first speed, and $27.0 < X < 37.0$.

19. The apparatus of claim 11, wherein:

said wing includes a hub wall, an outer wall, and an intermediate wall, and said hub wall, said outer wall, and said intermediate wall are configured so as to define said pocket.

20. A wind driven electrical power generating apparatus, comprising:

a central hub;

an armature extending radially outwardly from said central hub; and a wing secured to said armature, wherein (i) said wing defines a pocket having a hub end and an outer end, (ii) said hub end of said pocket defines a first volume, (iii) said outer end of said pocket defines a second volume, (iv) said second volume is greater than said first volume, (v) said hub end of said pocket is positioned a first radial distance from said central hub, (vi) said outer end of said pocket is positioned a second radial distance from said central hub, and (vii) said first radial distance is less than said second radial distance.

21. The apparatus of claim 20, wherein:

said hub end of said pocket has a first width, said outer end of said pocket has a second width, said second width is greater than said first width, said hub end of said pocket has a first depth, said outer end of said pocket has a second depth, and said second depth is greater than said first depth.

* * * * *